United States Patent [19]

Nagashima et al.

[11] Patent Number: 4,896,116
[45] Date of Patent: Jan. 23, 1990

[54] PULSE RADAR METHOD AND APPARATUS FOR DETECTING AN OBJECT

[75] Inventors: Yuji Nagashima, Tokorozawa; Yoshikazu Sudo, Iruma; Junichi Masuda, Tokyo; Yuzo Matsudaira, Higashiyamato; Kishio Arita, Kunitachi; Eiji Nagai, Yokohama, all of Japan

[73] Assignee: Nippon Telegraph and Telephone Corporation, Tokyo, Japan

[21] Appl. No.: 207,280

[22] PCT Filed: Oct. 30, 1987

[86] PCT No.: PCT/JP87/00838

§ 371 Date: May 23, 1988

§ 102(e) Date: May 23, 1988

[87] PCT Pub. No.: WO88/03276

PCT Pub. Date: May 5, 1988

[30] Foreign Application Priority Data

Oct. 30, 1986 [JP] Japan ................................ 61-256764
Oct. 12, 1987 [JP] Japan ................................ 62-254738
Oct. 28, 1987 [JP] Japan ................................ 62-272133

[51] Int. Cl.$^4$ .......................... G01V 3/12; G01V 3/38; G01R 23/16; G01S 13/04
[52] U.S. Cl. ..................... 324/329; 324/77 B; 324/337; 342/22; 342/459; 364/923.4
[58] Field of Search .................. 324/77 R, 77 B, 326, 324/329, 337, 207; 342/22, 118, 458, 459; 364/561, 576, 923.4

[56] References Cited

U.S. PATENT DOCUMENTS 3,883,726  5/1975  Schmidt ........................ 324/77 B X
3,973,112  8/1976  Sloane .......................... 324/77 B X
4,126,860 11/1978  Sullivan et al. .................... 342/22 X
4,686,457  8/1987  Banno ........................... 324/77 B X
4,698,634 10/1987  Alongi et al. .................... 324/337 X

FOREIGN PATENT DOCUMENTS 56-140220 11/1981 Japan .
61-30782   2/1986 Japan .
61-264277 11/1986 Japan .
61-271484 12/1986 Japan .

OTHER PUBLICATIONS

"A Characterization of Subsurface Radar Targets", by Chan, Moffet & Peters, Proceedings of the IEEE, vol. 67, No. 7, Jul., 1979, pp. 991–1000.
Keisoku & Seigyo (Measurement & Control), vol. 20, No. 8, Aug. 1981 (Tokyo) pp. 30–31 "Underground-/Underwater Exploration by Electromagnetic Waves".

Primary Examiner—Gerard R. Strecker
Attorney, Agent, or Firm—Frishauf, Holtz, Goodman & Woodward

[57] ABSTRACT

An object detection method and apparatus in which, in order to distinguish only an echo wave which is returned back from an object of interest, such as an underground buried object, from those echo waves returned back from another object of objects, the observation signal is divided (an electromagnetic wave as an echo wave) into portions, and the signal portion is converted into a corresponding frequency region to evaluate that spectral distribution and computes frequency parameter values from the spectrum distribution. The object of interest is detected by comparing the reference data of various fields with the parameters of the object of interest, extracting only an echo wave returned back from the object of interest and displaying a corresponding image.

17 Claims, 13 Drawing Sheets

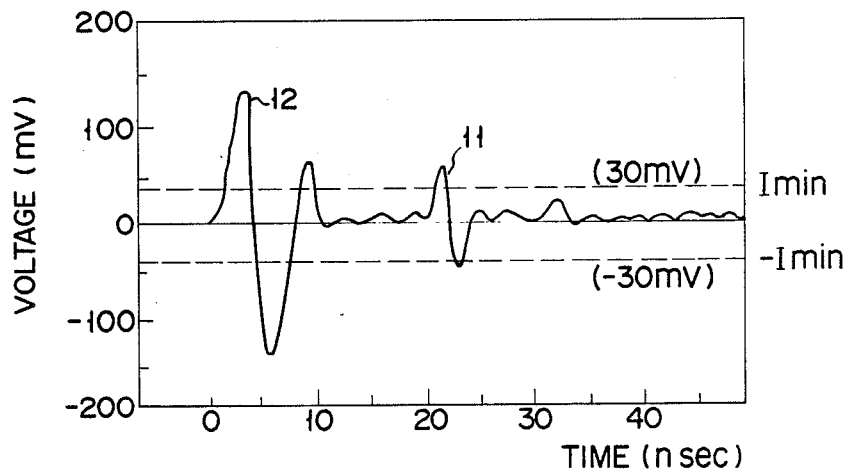
F I G. 2
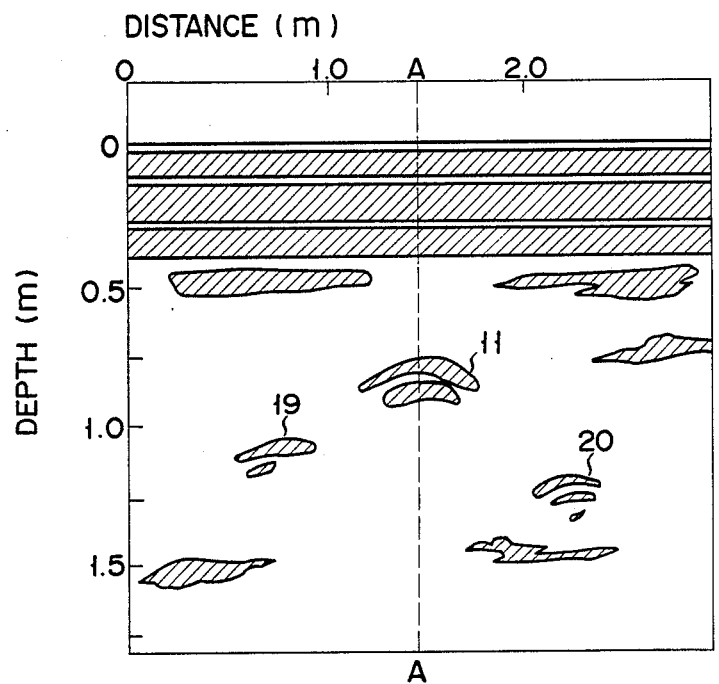
F I G. 3

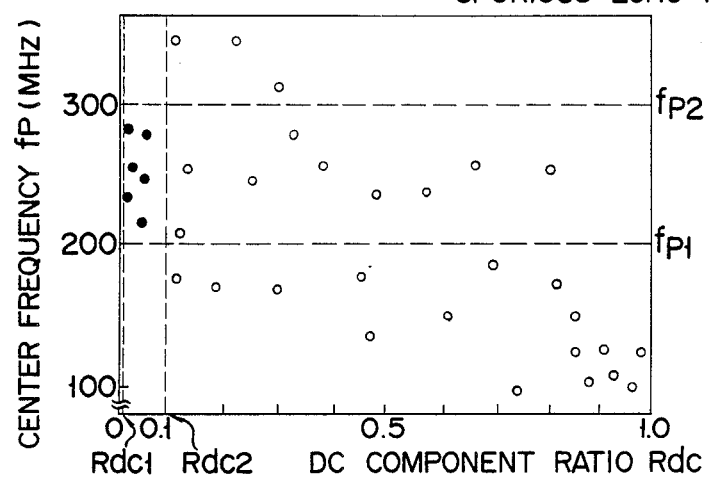
F I G. 7
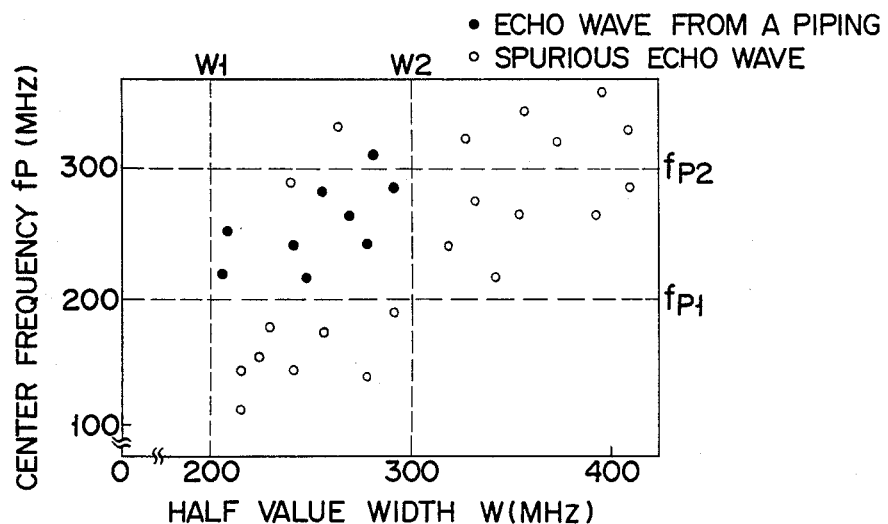
F I G. 8

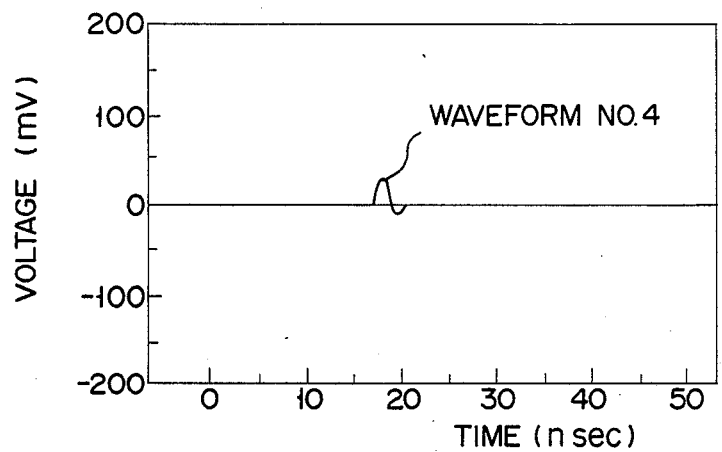
F I G. 9
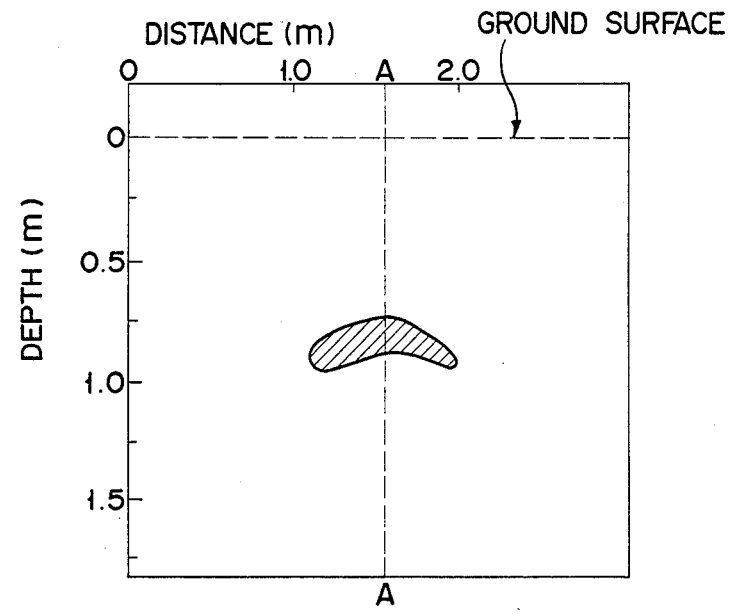
F I G. 10

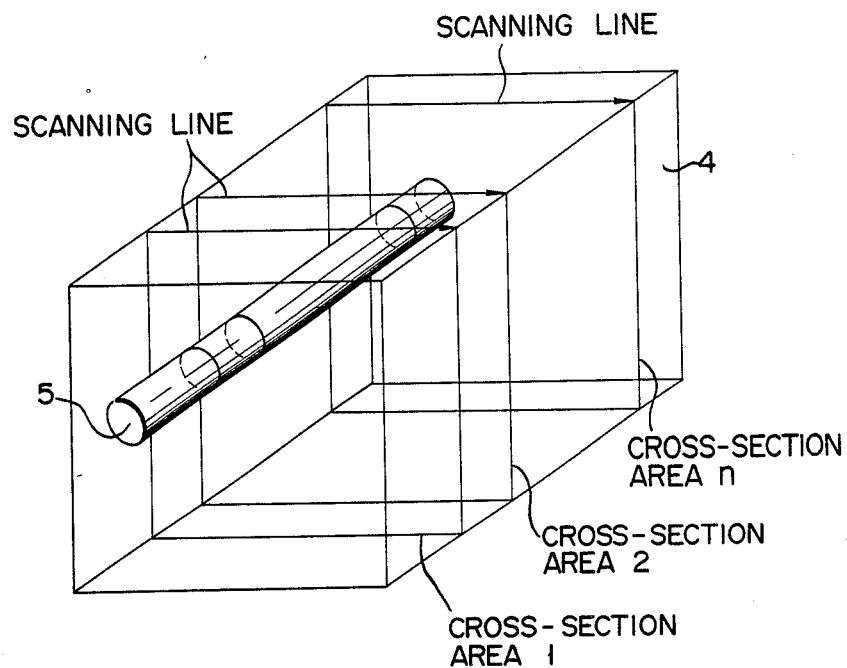
F I G. 11

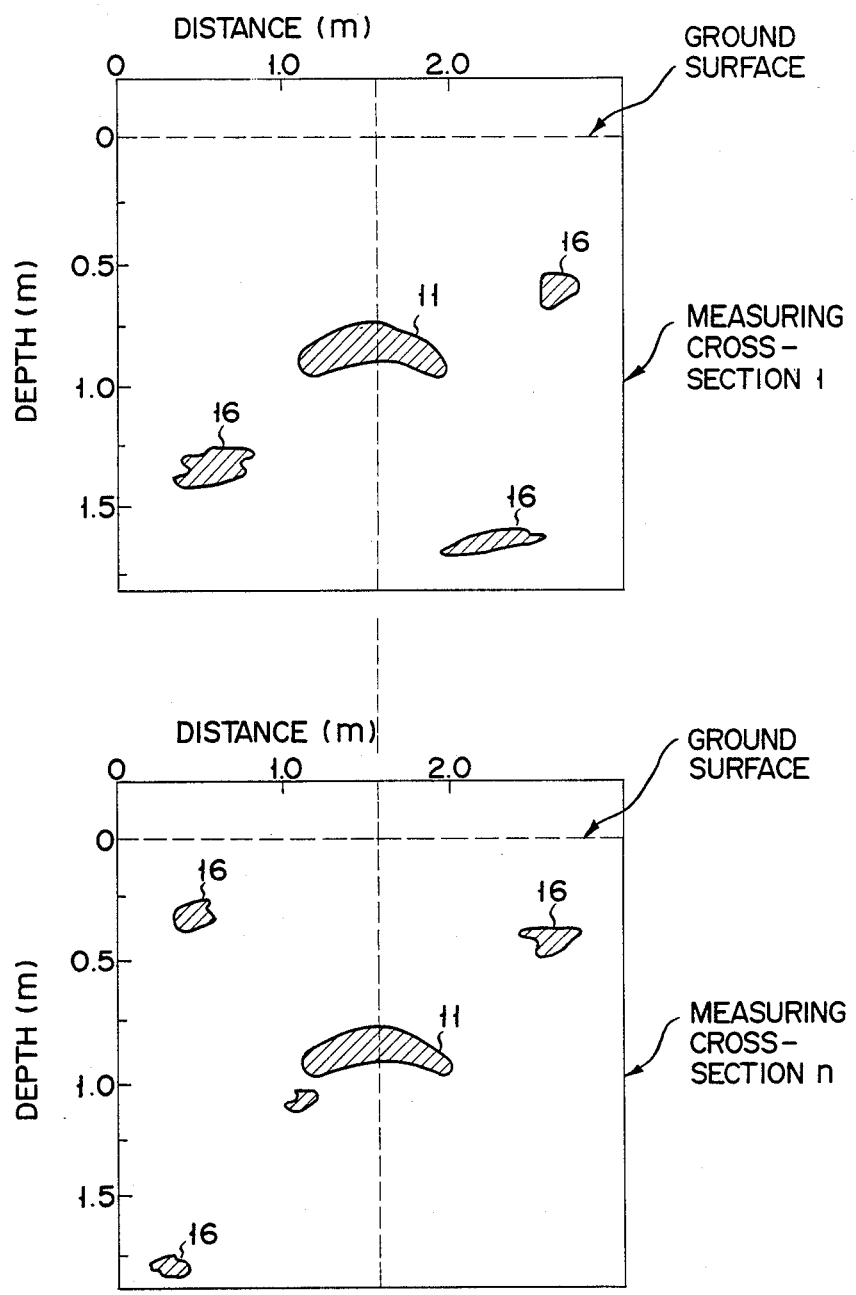
F I G. 12

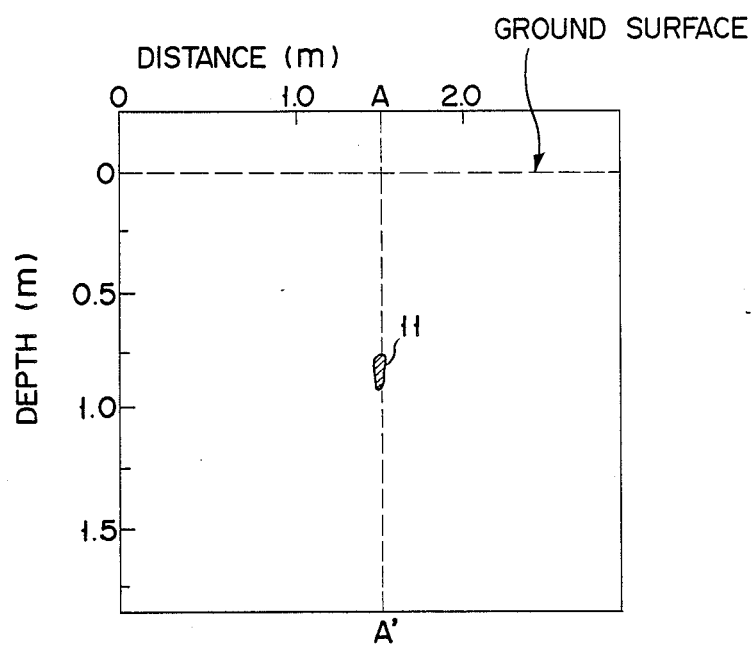
F I G. 15

PULSE RADAR METHOD AND APPARATUS FOR DETECTING AN OBJECT

BACKGROUND OF THE INVENTION

This invention relates to a method and apparatus for detecting an invisible object, such as an underground buried object, by transmitting an electromagnetic wave and receiving an echo wave from the object.

FIG. 1 is a schematic view showing a measuring system for detecting an underground buried object using an electromagnetic wave. An electric pulse which is sent from pulse generator 1 is fed to transmitting antenna 2 where it is radiated as an electromagnetic wave into the underground. The radiated electromagnetic wave is reflected on an object, such as water layer 17, stone 18, underground buried piping 5, 13, and returned as an echo wave to receiving antenna 6. In a practical measuring apparatus, transmitting and receiving antennas 14 are formed as one system. The echo wave is fed via sampling unit 7 to computing unit 9 where it is computed. Then the result of computation is sent to display unit 10.

FIG. 2 shows an example of a measurement observation signal which is incident to receiving antenna 6 moved over underground buried piping 5. In FIG. 2, the abscissa represents a time unit which needs to be calculated in terms of the distance. It is, therefore, necessary to compute the velocity of a wave which is propagated across the underground. The velocity is given by:

$$V = \frac{c}{\sqrt{\epsilon_s}} \quad (1)$$

wherein:

c: velocity of the electromagnetic wave propagated through a vacuum space; and $\epsilon_s$: dielectric constant of the earth.

In this connection it is to be noted that it is necessary to measure the dielectric constant $\epsilon_s$ of the earth at the measuring site. The dielectric constant $\epsilon_s$ of the earth is generally 4 to 20. The abscissa in the graph of FIG. 2 denotes the round trip time of an electromagnetic wave between the ground surface and the object. In this case, the depth L is expressed as follows:

$$L = \frac{T}{2} \cdot V \quad (2)$$

where T represents the time of an electromagnetic wave propagated between the ground surface and the object.

In actual practice, antenna system 14 including transmitting antenna 2 and receiving antenna 6 is scanned in a direction of arrow 105 of FIG. 1 and an observation signal is stored in computing unit 9 each time the antenna is moved a distance of 2 cm. At the completion of scanning, the distance is calculated in terms of the depth according to Equation (2) and observation signals are sequentially arranged in the order in which they are picked up as shown in FIG. 3 (the abscissa: scanning distance; the ordinate: depth of the earth). The amplitude of the signal is stepwise distinguished, usually in color, in accordance with the level of the amplitude to form an underground cross-sectional image. FIG. 3 is an example of an underground cross-sectional image as displayed on display unit 10 of FIG. 1. In the graph of FIG. 3, the abscissa denotes the distance as set forth above and the ordinate denotes the depth of the earth, noting that the dielectric constant of the earth at a detection site was found to be 16 upon measurement and so calculated and that the observation signal of FIG. 2 corresponds to a distance A—A in FIG. 3. In the underground cross-sectional image shown in FIG. 3, a time position for those observation signals of an amplitude of over 30 mV and a time position under 30 mV are indicated by a cross-hatched area and white area, respectively. That is, the amplitude 30 mV is the minimum discrimination amplitude I min of the observation signal.

In order to distinguish the echo waves returned back from the object to be detected, such as buried piping or water layer, from a superimposed signal of various echo waves, the amplitude magnitudes of the observation signals are employed as a discrimination standard. As shown, for example, in "Applied Science Center for Archaeolog-MASCA Newsletter vol 11 NO2 December 1975, echo wave 11 whose amplitude is greater than a minimum discrimination width Imin as shown in FIG. 2 has been employed as an echo wave returned back from the object, noting that wave 12 denotes a ground surface echo wave. In the case where, for example, there are some objects, such as stones 18, which are distinct from the object to be detected, that is, some causes for strongly returning the magnetic wave, a plurality of echoes 19, 20 appear in the underground cross-section as shown in FIG. 3. This makes it very difficult to distinguish the echo wave coming from the object to be detected, from the plurality of echoes of objects.

It is accordingly an object of the present invention to provide an object detection method and apparatus which can positively and accurately detect an object of interest even if there are a plurality of the other object of objects from which an echo wave or waves are returned back.

SUMMARY OF THE INVENTION

According to the present invention, an object detection method and apparatus are provided which transmit a pulse wave of a broad frequency characteristic into the earth, receive for each scanning distance of an antenna a signal observed as an overlapped echo wave returned back from various objects below the surface of the earth, divide the observation signal into portions for every time interval, convert the divided signal portion into a corresponding frequency region to obtain a spectral distribution, eliminate spurious echo wave 5 from the observation signal with the use of the frequency region data (spectrum peak frequency $f_p$, DC component ratio $R_{dc}$ and half value width W) obtained, and display a result of the elimination processing, as cross-sectional data, on a display unit.

Furthermore, the aforementioned method and apparatus perform a correction computation on multi-cross-sectional data obtained as the echo wave and recognize the object of the interest as being an underground buried object of a linear structure. It is also possible to additively combine, with an echo wave obtained as a hyperbolic configuration, an amplitude level of other hyperbolas to perform a synthetic-aperture processing, and to enhance the horizontal resolution. It is possible to perform such a synthetic-aperture-processing on echo waves returned, as a multi-cross-section data, back from an underground buried object of a linear structure and to enhance the amplitude level of a signal corresponding to the position of the buried object through the utilization of the horizontal broadening of the electromagnetic wave emitted from the antenna.

BRIEF DESCRIPTION OF THE DRAWINGS

FIG. 2 is a waveform diagram showing an example of one observation signal input to a computation section in FIG. 1;

FIG. 3 shows a cross-sectional image on a display unit which, when an antenna system is moved in a direction of an arrow in FIG. 1, is obtained from an underground buried object below the surface of the earth at a different location;

FIG. 7 is a graph showing a relation of a DC component ratio of the divided signal portion to a center frequency;

FIG. 8 is a graph showing a relation of a half value width of divided portions to the center frequency;

FIG. 9 is a waveform diagram showing only an echo waveform of FIG. 5 with a spurious echo wave eliminated in which case the echo signal has been returned back from an object;

FIG. 10 is a cross-sectional view showing an object corresponding to the echo waveform of FIG. 9;

FIG. 11 is a model diagram necessary to detect a plurality of cross-sectional data to be obtained from the cross-section of the earth including an object of interest;

FIG. 12 is a cross-sectional view showing an object of interest obtained from the result of processing of multi-cross-section data 1 to n;

FIG. 15 is a cross-sectional view showing an object image reconstituted by a synthetic-aperture processing.

DETAILED DESCRIPTION

An explanation will now be given below as to how to detect an underground buried object, such as an underground buried piping, by referring to the accompanying drawings.

1. Method for Detecting an Object

The method for detecting an object in accordance with the present invention is characterized in that an object is detected by eliminating spurious echo waves from an observation signal, obtained as various overlapped echo waves from the underground object, with the use of a signal frequency region. The embodiment of the present invention will be explained below in greater detail.

Figure 4:
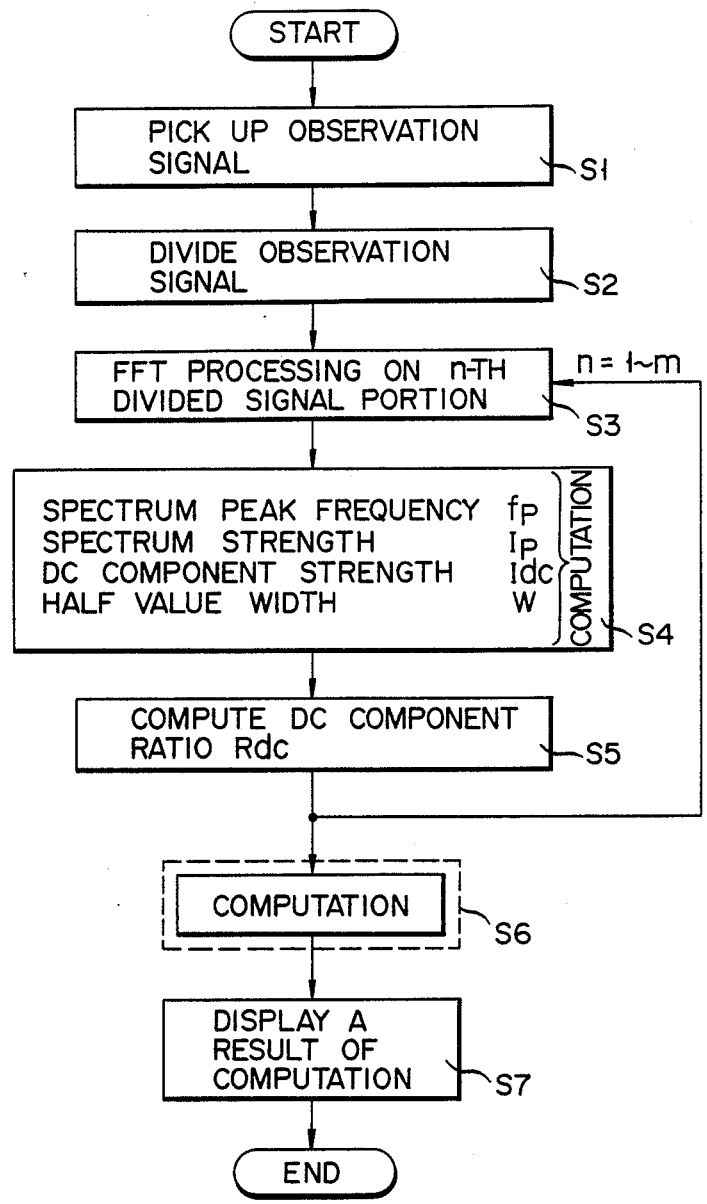
FIG. 4 is a flowchart for explaining the process of detecting an object in accordance with the present invention, as well as the function of an apparatus used for that process, FIGS. 4A through FIG. 4D each showing a mode of computation at a different computation stage.

FIG. 4 is a flowchart for detecting an object, to be detected, in accordance with the present invention. An explanation will be given below of the flowchart of FIG. 4.

Pickup of an observation signal

Figure 1:
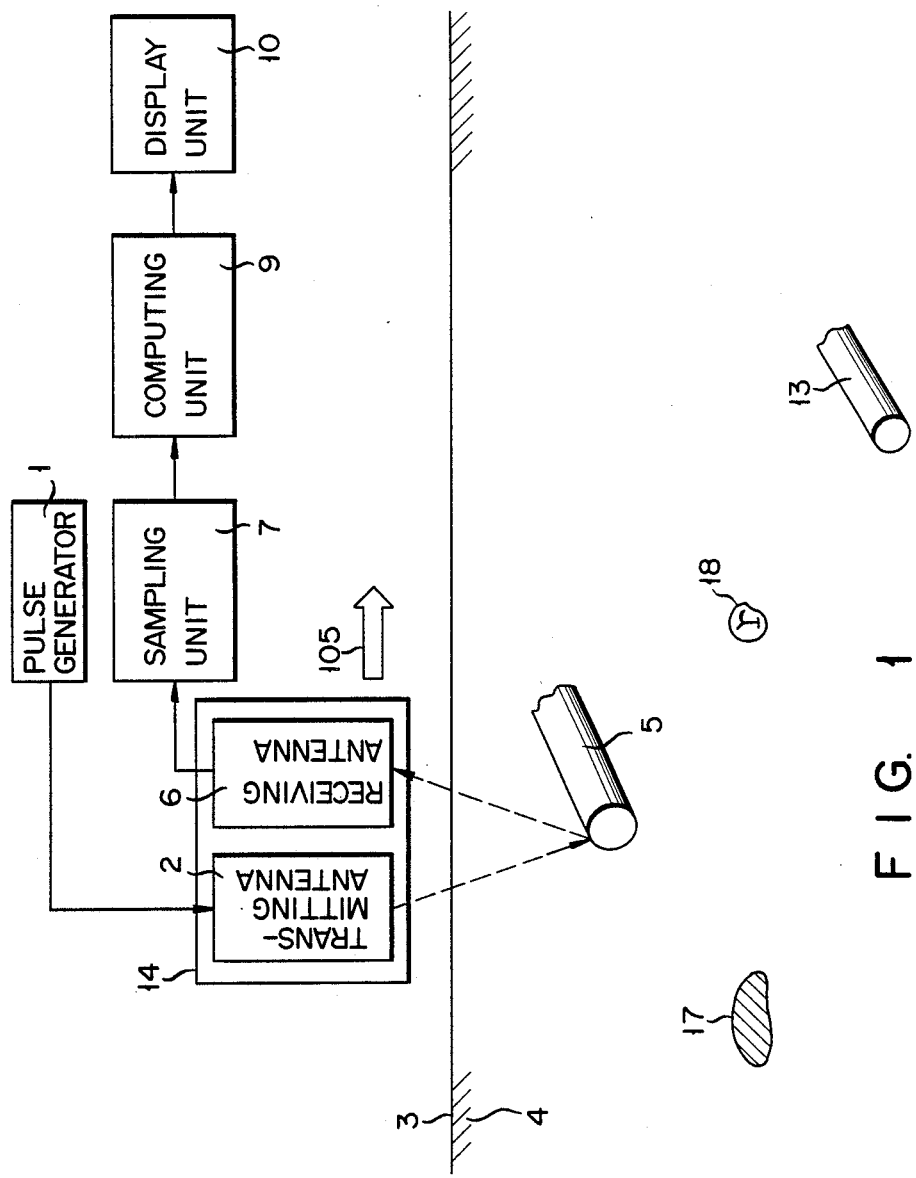
FIG. 1 is a block diagram for explaining a conventional object detection method and apparatus.

A process, up to the picking-up of an observation signal, is based, like the conventional technique of FIG. 1, on the principle of a pulse radar method.

First, electric pulses are fed from a pulse generator to a transmitting antenna where they are converted into an electromagnetic wave. The electromagnetic wave is radiated into the earth or the underground, returned back from an object different from the underground area in terms of an electric constant, such as the dielectric constant, and picked up by the receiving antenna. The receiving antenna converts the electromagnetic wave which is returned back from the object into an electric signal which in turn is sampled by a sampling unit to obtain an observation signal as shown, for example, in FIG. 5. By effecting a scanning by moving the transmitting and receiving antennas in one direction, an underground cross-sectional area is obtained which appears along the scanning direction. Stated in more detail, the transmitting and receiving antennas are moved in one direction and an observation signal is collected each time it is moved a distance of 2 cm. The observation signal is converted into depth data on the basis of Equation (2) as set out above and observation signals, if being arranged on a coordinates system with the moving distance as the abscissa and the depth of the earth as the coordinate, provide the underground cross-sectional configuration.

Division of an observation signal

The observation signal appears as superimposed echo waves at all underground interfaces, such as layers, stones, caves, etc. The echo waves coming from the object being detected are carried, in a time position, on the respective observation signal. The observation signal is divided into time segments. Two kinds of methods are known;

(1) An observation signal is divided by a predetermined time interval $\Delta T$ into portions.

(2) An observation signal is divided by a zero-crossing method into portions for each time corresponding to one cycle.

An observation signal will now be explained as being divided by the zero-crossing method into portions for every time period corresponding to one cycle.

Figure 5:
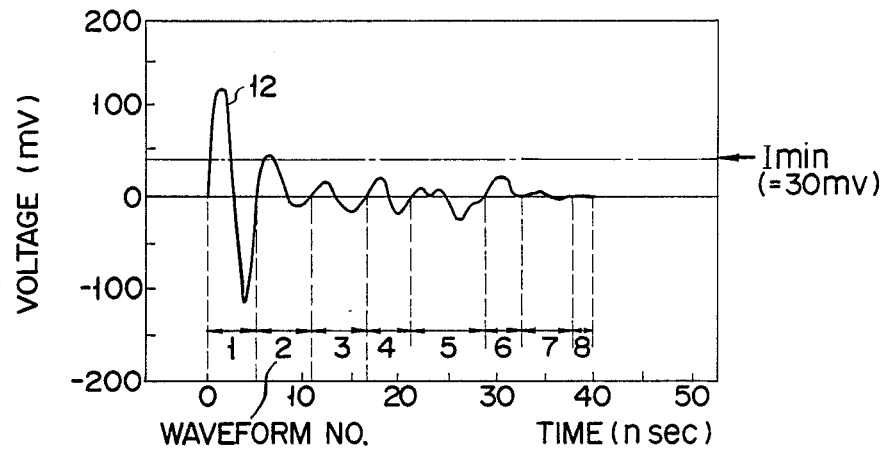
FIG. 5 is a graph for explaining one form of a waveform of an observation signal which is subjected to a waveform analysis, as well as the division of that waveform.

FIG. 5 shows an observation signal obtained at step S1 in FIG. 4 and one form of a waveform portion divided by the zero-crossing method. The intervals as indicated by an arrow in FIG. 5, each, are a time interval corresponding to one cycle when the zero-crossing method is used and are represented with the waveform number added for each divided waveform portion. Here the waveform No. 1 in FIG. 6 (at an upper portion) is shown as being separated from the waveform shown in FIG. 5.

Conversion into a frequency region

Figure 6:
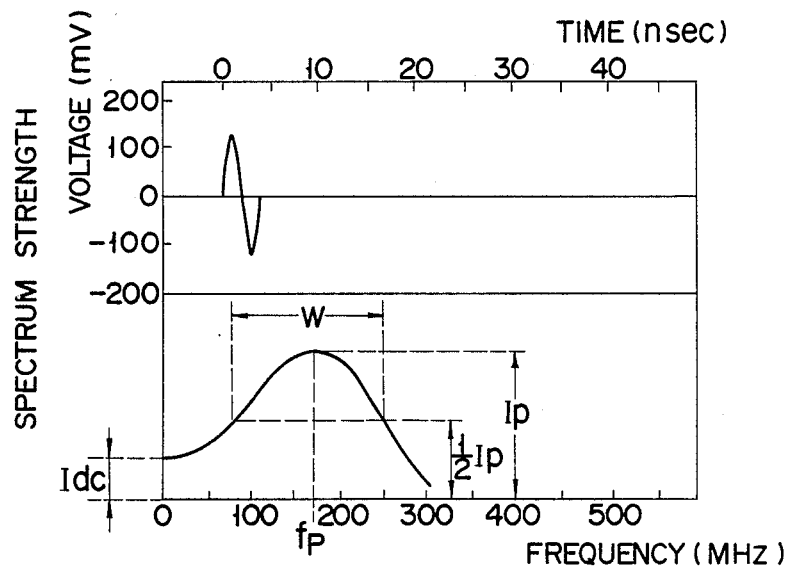
FIG. 6 shows one divided portion of the observation signal as shown in FIG. 5.

The separated waveform is converted into a frequency region by an FET (Fast Fourier Transformation) in a waveform analytical device so that the spectrum distribution may be found-step S3 (the lower portion in FIG. 6).

Reading out of features

From a spectrum distribution obtained, a strongest peak is found and then the spectrum frequency (spectrum peak frequency) $f_p$, spectrum strength $I_p$ for the spectrum strength $f_p$, DC component strength $I_{dc}$ and half value width W are read out-step S4.

Computation of a DC component ratio $R_{dc}$

A DC component ratio $R_{dc}$, that is, a ratio of a DC component strength $I_{dc}$ to a spectrum peak strength $I_p$ is computed by the following equation-step S5.

$$R_{dc} = I_{dc}/I_p \quad (3)$$

FIG. 6 shows, at the upper portion, a waveform separated from the observation signal and, at the lower portion, the spectrum distribution diagram of the separated waveform with the peak frequency represented by $f_p$ and peak strength of the spectrum represented by $I_p$ as well as with the DC component strength represented by $I_{dc}$, and half value width represented by W.

Elimination of a spurious echo wave

For the divided wave portions of the observation signal the aforementioned processes are repeated at steps S3, S4 and S5. For the spectrum peak frequency $f_p$, DC component ratio $R_{dc}$ and half value width W obtained, those divided waveforms having a value range other than $f_{p1} < f_p < f_{p2}$, $R_{dc1} < R_{dc} < R_{dc2}$ and $W_1 < W < W_2$ are eliminated as spurious echo waves through the utilization of the characteristics of FIGS. 7 and 8.

FIGS. 7 and 8 are graphs showing $f_p$-$R_{dc}$ and $f_p$-W distributions, respectively, which were obtained from an observation signal by various tests conducted. In the graphs shown in FIGS. 7 and 8, solids dots represent the characteristics of the echo waves returned back from the underground buried piping and open dots represent the characteristic of the spurious echo waves. From these graphs it has been found that the characteristic of the echo wave returned back from the underground piping is evidently concentrated within a range of $f_{p1} < f_p < f_{p2}$, $R_{dc1} < R_{dc} < R_{dc2}$ and $W_1 < W < W_2$. Table 1 shows one example of $f_{p1}$, $f_{p2}$, $R_{dc1}$, $R_{dc2}$, $W_1$ and $W_2$.

TABLE 1

| | |
|---|---|
| $f_{p1}$ | 200 (MHz) |
| $f_{p2}$ | 300 (MHz) |
| $R_{dc1}$ | 0 |
| $R_{dc2}$ | 0.1 |
| $W_1$ | 200 (MHz) |
| $W_2$ | 300 (MHz) |

Of the divided wave portions, a plurality of wave portions are present which satisfy any of the filtering conditions for the center frequency $f_p$, DC component ratio $R_{dc}$ and half value width W. As evident from Table 2, there is only one divided wave portion (wave No. 4) in the observation signal which simultaneously satisfies the aforementioned three conditions. This wave portion is considered as an echo wave returned back from the underground piping and extracted as such.

Here, Table 2 shows the values of the center frequency $f_p$, DC component ratio $R_{dc}$ and half value width W calculated for the respective divided wave portion in FIG. 5.

TABLE 2

| Echo signal No. | $f_p$ (MHz) | $R_{dc}$ | W (MHz) |
|---|---|---|---|
| 1 | 400 | 0.2 | 200 |
| 2 | 70 | 0.8 | 100 |
| 3 | 170 | 0.02 | 200 |
| 4 | 250 | 0.01 | 250 |
| 5 | 150 | 0.25 | — |
| 6 | 70 | 0.95 | 120 |
| 7 | 130 | 0.01 | 250 |
| 8 | 290 | 0.02 | 450 |

The signal processing (step S6) including the elimination of the spurious echo wave and extraction of the echo wave returned back from the underground piping is performed for an observation signal of FIG. 5.

If the aforementioned signal processing is performed for all the observation signals recorded each time the antenna is moved a distance of 2 cm, it is possible to extract only the echo wave returned back from the underground piping.

FIG. 10 shows a cross-sectional image on a coordinates system reconstituted from observation signals processed by the aforementioned method, noting that the abscissa denotes the scanning distance and the ordinate denotes the depth. The waveform as shown in FIG. 9 corresponds to a location indicated by the dotted line A—A in FIG. 10. In FIG. 10, a cross-hatched area shows the position where the wave of interest is located-step S7.

In this way, a specific underground buried object (a steel piping in the present embodiment) can be detected utilizing the characteristics shown in Table 1.

Since the boundary condition value of an object (the steel piping in the embodiment), to be detected, is an inherent value, it varies if a different object is detected under the surface of the earth. Even if the object being detected is another type of object, such as a vinyl chloride piping, cavity and earth layer, or some objects in an electromagnetic wave transmission medium, such as steel frames or cracks in a concrete structure, then it is possible to detect the object if the characteristics ($f_p$, $R_{dc}$, W) of an echo wave returned back from any of these objects is initially found experimentally.

The echo wave (returned back from the underground piping) can be extracted by utilizing one characteristic value or a combination of two characteristic values ($f_p$-$R_{dc}$, $f_p$-W), depending upon the underground state involved.

Multi-cross-section processing

Figure 4A:
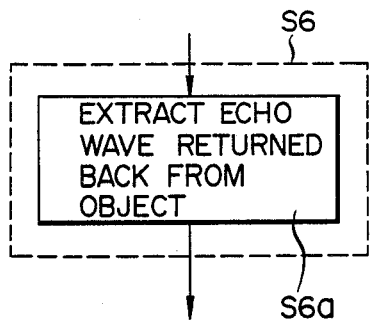
Figure 4B:
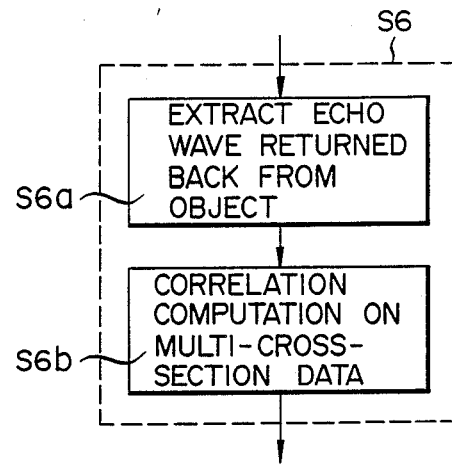

Although, in the aforementioned embodiment, the computation processing has been explained as the process of extracting the echo wave without considering the length and configuration of the object being detected (step S6a in FIG. 4A), the detection accuracy can be enhanced by performing a correlation computation (step S6b in FIG. 4B) on multi-cross-section data which are picked up in a direction perpendicular to that of the lying of the underground piping after the echo wave returned back from the object has been extracted (step S6a) in the case where the object is an underground piping of a linear structure.

The method for processing the multi-cross-sectional data will be explained below.

The transmitting/receiving antennas are moved in a direction parallel to the antenna scanning line as indicated by an arrow in FIG. 11 to record a plurality of the underground cross-section data. In the case where the object to be detected is underground piping 5 of a linear structure perpendicular to the scanning direction of the antenna, a plurality of cross-section data are subjected to a signal processing to obtain a plurality of cross-sectional images covering a measuring cross-section area n as measuring cross-section 1, for example, in FIG. 12. From the multi-cross-section data thus obtained those waveforms are gained which are present in the same horizontal and vertical positions. The waveforms thus gained are recognized as echo waveforms returned back from underground piping 5 of a linear structure and the other waveforms are rejected. In this way the correlation computation is performed on the multi-cross-section data to obtain a cross-section as shown previously in FIG. 10.

Synthetic-aperture processing

Figure 4C:
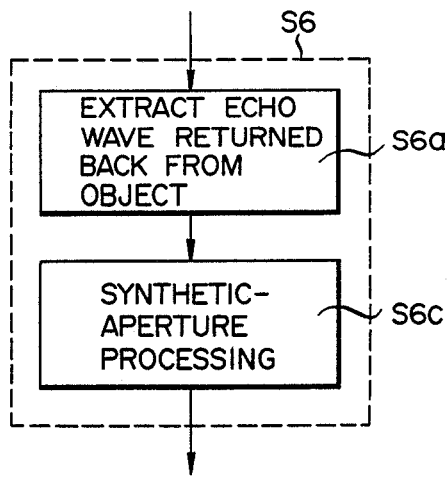
Figure 13:
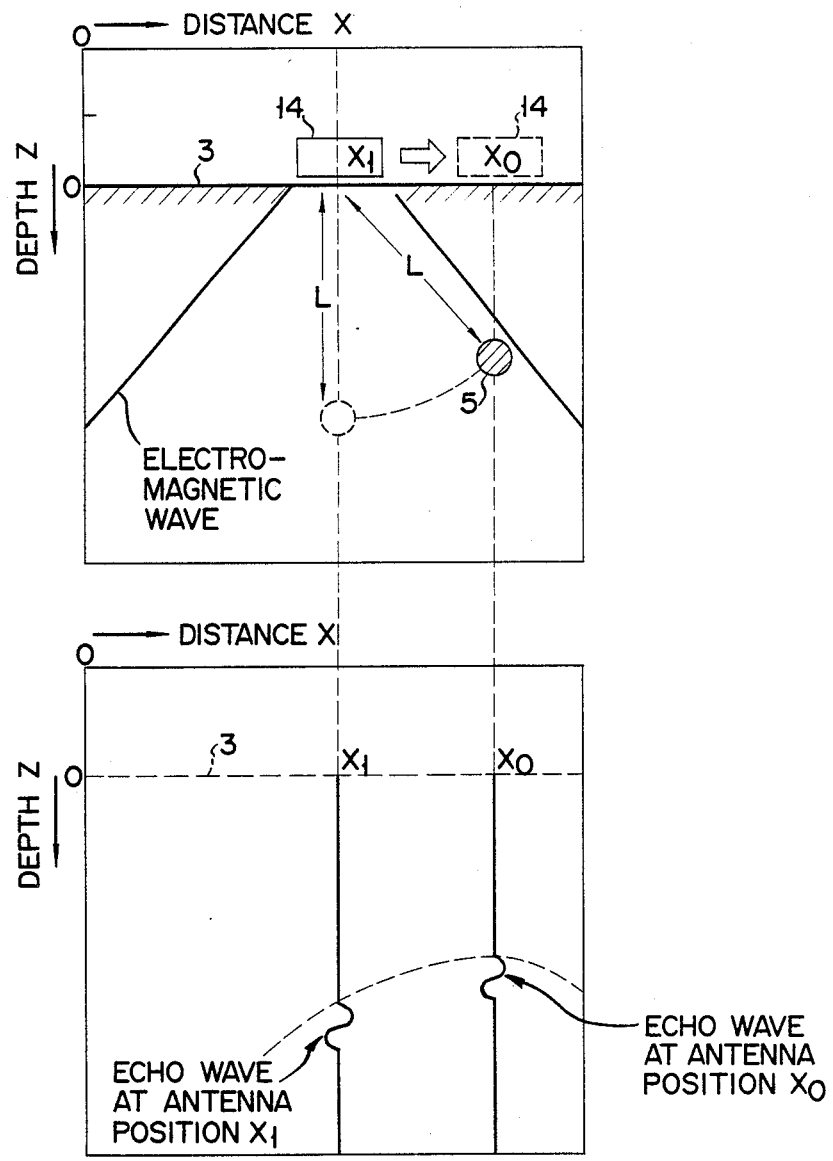
FIG. 13 is a model diagram for explaining the echo wave, returned back from an object, as being obtained as a hyperbolic configuration.

As shown in FIG. 10, the echo waves returned back from the object take a hyperbolic configuration, because an electromagnetic wave radiated from the antenna is broadened at some angle. This picture is shown in FIG. 13. If the object to be detected and antennas are located in a relative relation as shown in FIG. 13 with L indicating the distance between the antenna and the object, the object is observed in the antenna position $X_1$ as if it were located at an area a distance L below the antenna. Upon moving the antenna in a direction indicated by the arrow in FIG. 13, the distance L between the antenna and the object becomes small and thus the forward/backward trip T of the electromagnetic wave becomes small. An echo wave obtained when the antenna is located in an area Xo just above the object being detected occupies an apex of the aforementioned hyperbolic configuration. For this reason, in the underground cross-section image, a group of echo waves returned back from the object becomes hyperbolic, causing the horizontal resolution to be prominently degraded. In order to enhance the horizontal resolution it is advantageous to perform a synthetic-aperture processing on the underground cross-section data which is processed by the aforementioned method. For this reason, subsequent to extracting the echo waves returned back from the object (S6a) in the the calculation processing step (Step S6), the synthetic-aperture processing (S6c) is performed as shown in FIG. 4C.

Figure 14:
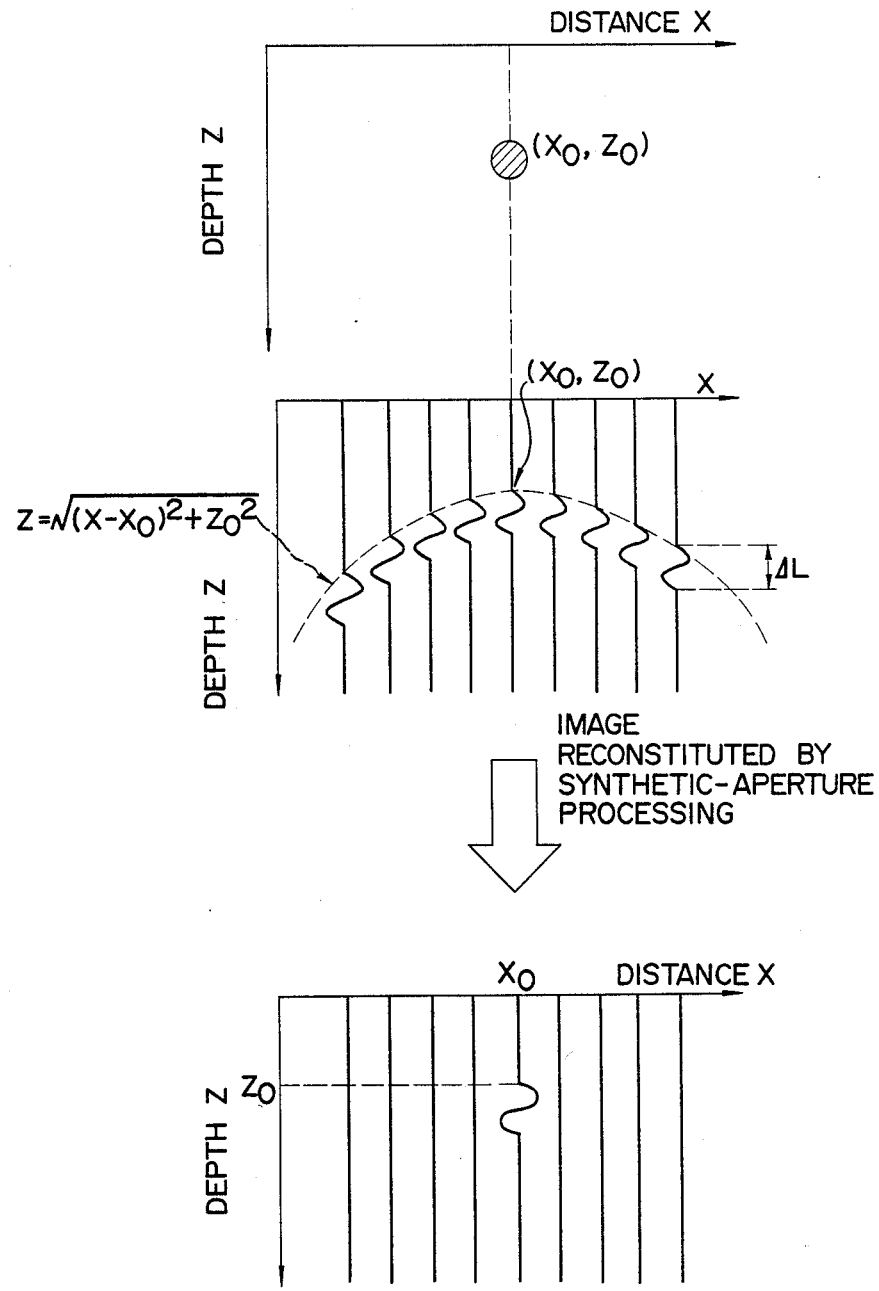
FIG. 14 is a model diagram associated with a synthetic-aperture processing.

FIG. 14 is a principle diagram on which the synthetic-aperture procesing is performed. In the diagram shown in FIG. 14, the X- and Z-axes denote the ground surface and depth direction, respectively. In the case where the object to be detected is present at an area (Xo, Zo), the leading edge of the echo wave upon the scanning of the object by the antenna is located on $$Z = \sqrt{(X - Xo)^2 + Zo^2} \quad (4)$$

In order to obtain an image of the object at the area (Xo, Zo), therefore, the waveform level in the position of a hyperbolic configuration represented by Equation (4) is added to the waveform level of the area (Xo, Zo), so that the wave amplitude on the area (Xo, Zo) is grown. In actual practice, since the echo waveform is oscillated by an amount $\Delta L$ (that is, the echo wavelength $\Delta L$) from the area Zo, the echo waveform at the area (Xo, Z) is grown over the amplitude range of $$Z = Zo \sim Zo + \Delta L$$

If the aforementioned processing is performed over a whole coordinate position $(X_1, Z_1)$ wherein $1 = 1 \sim n$ and $j = 1 \sim m$ (n, m: data points), then in the coordinate position corresponding to the object a corresponding waveform amplitude is markedly grown and in the other coordinate position there is almost no waveform amplitude growth. Hence the coordinate position $(X_1, Z_1)$ which is peaked in amplitude after the aforementioned processing has been performed represents the "buried" position $(X_o, Z_o)$ of the object to be detected.

FIG. 15 shows an example when the present processing is performed on the underground cross-section image of FIG. 10. The horizontal resolution can be enhanced by the present processing on the underground cross-section data.

Display of a result of processing

The scanning cross-section data, as well as the data processed by the present invention, is output to display unit 10 for display.

Figure 4D:
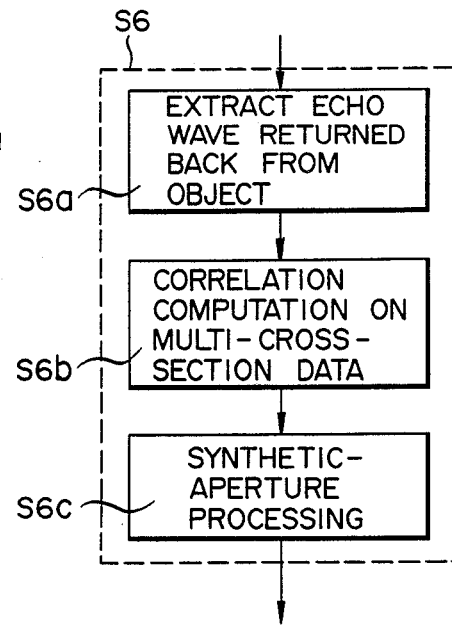

The synthetic-aperture processing (step S6c) can also be applied to an underground buried piping having a linear structure. In this case, as shown in FIG. 4D, the process (S6a) of extracting echo waves returned back from the object being detected is performed a plurality of times in a direction perpendicular to that in which the piping has been buried, the correlation processing (step S6b) is performed on the multi-cross-section data collected, and finally-the synthetic-aperture processing (step S6c) is performed on the result of each correlation computation corresponding to each cross-section data to enhance the horizontal resolution. Respective steps S6a, S6b and S6c as shown in FIG. 4D are the same as in FIGS. 4A to 4C and further explanation is omitted.

2. Object Detection Apparatus

The object detection apparatus according to the embodiment of the present invention will now be explained below.

Figure 16:
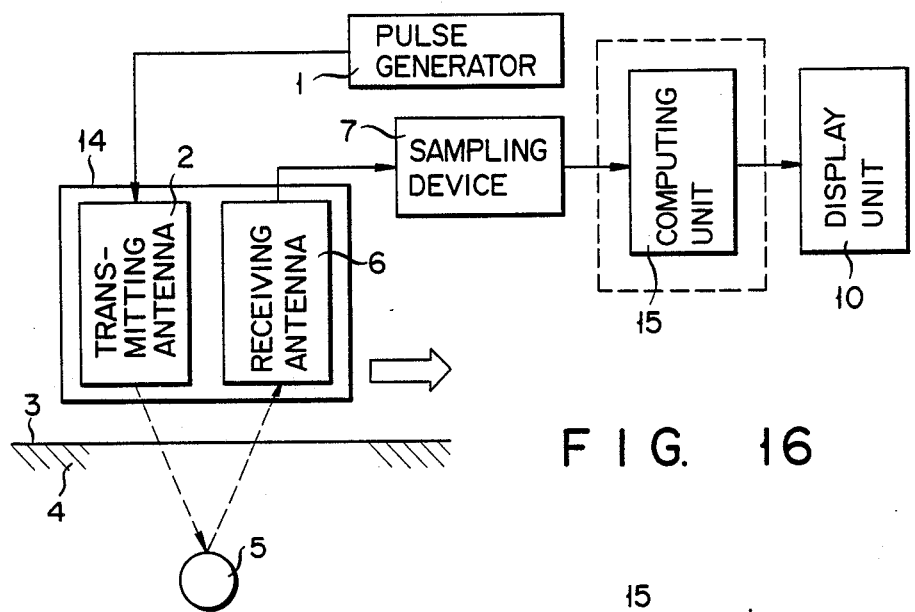
FIG. 16 is a block diagram for explaining a method and apparatus for detecting an underground buried object in one aspect of the present invention, FIGS. 16A to 16D each showing a block diagram of a computing unit of a different internal structure.

FIG. 16 is a schematic view showing an object detection apparatus according to the embodiment of the present invention which detects an underground buried object as an object to be detected. In FIG. 16, pulse generator 1 is adapted to generate an impulse (monopulse) signal of a high output level, transmitting antenna 2 of a broad-band frequency characteristic is adapted to radiate an electromagnetic wave to which a pulse signal from the pulse generator is converted. Reference numerals 3, 4 and 5 show a ground surface, underground area and underground buried piping, respectively. Receiving antenna 6 of a broad-band frequency characteristic is adapted to collect the electromagnetic wave returned back from the object and to convert it into an electric signal. In this connection it is to be noted that, in the present embodiment, the transmitting and receiving antennas, though being shown as separate ones, may be constructed of a single transmitting/receiving antenna. 14 shows an antenna system with transmitting and receiving antennas 2 and 6 mounted thereon. Sampling device 7 is provided for sampling a signal which is sent from receiving antenna 2. Computing unit 15 is provided to divide an observation signal into given time intervals and to perform a fast Fourier transformation for each divided wave portion. Display unit 10 is connected to computing unit 15.

The operation of the object detection apparatus of the present invention will now be explained below in more detail.

Transmitting and receiving antennas 2 and 6 are set near the ground surface. A high-output electric pulse is sent from pulse generator 1 to transmitting antenna 2 where an electromagnetic wave is radiated into the underground area. The electromagnetic wave propagates into the underground area and is returned, as echo waves, back from various objects having a different electric constant, such as the dielectric constant. The echo wave is picked up by antenna 6 and converted into an electric signal. The converted signal is sampled by sampling device 7 and sent as an observation signal to computing unit 15. Computing unit 15 comprises frequency analyzing section 15a as shown, for example, in FIG. 16A. Frequency analyzing section 15a performs the following processes (a) to (e):

(a) First, an observation signal which is an analog signal is converted into a digital signal. The digital observation signal is divided into wave portions for each time interval. Here a division method is adopted that performs a dividing operation by the zero-crossing method to obtain a corresponding period.

(b) The divided observation signal is converted into a frequency region by the FFT (fast Fourier transformation) processing in frequency analyzing section 15a. Here a power spectrum is found that represents the magnitude of an energy corresponding to each frequency component.

(c) From the spectrum distribution obtained, a peak strength is found to compute the spectrum frequency (the peak frequency of the spectrum) $f_p$, DC component ratio $R_{dc}$-See Equation (3)-and half value width W.

(d) Section 15a eliminates the spurious echo waves as set forth in section 1 in conjunction with the detection method. That is, if the values $f_p$, $R_{dc}$ and W computed in the process (c) fall within a range of $$f_{p1} < f_p < f_{p2}$$

$$R_{dc1} < R_{dc} < R_{dc2}$$

$$W_1 < W < W_2,$$

the divided wave portions are determined as echo waves returned back from the underground buried piping. If, on the other hand, the aforementioned values lies outside the aforementioned range, the echo waves are eliminated as spurious echo waves.

(e) The spurious component-eliminated observation signal, as well as the scanning cross-section data, is output to display unit 10 as shown in FIG. 16.

Figures 16A, 16B:
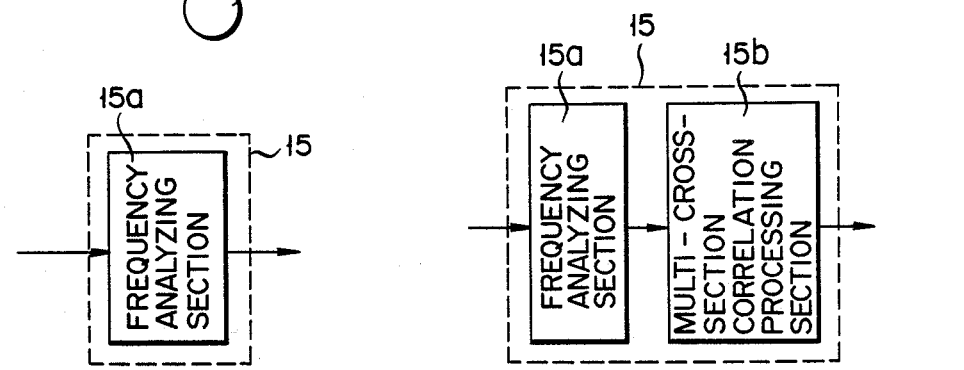

As shown in FIG. 16B, computing unit 15 comprises frequency analyzing section 15a and multi-cross-section correlation processing 15b performs a correlation computation. From the multi-cross-section data subjected to the signal processing, those waves present in the same horizontal and vertical positions are recognized as echo waves returned back from the buried piping having an linear structure and the other waves can be eliminated.

Figures 16C, 16D:
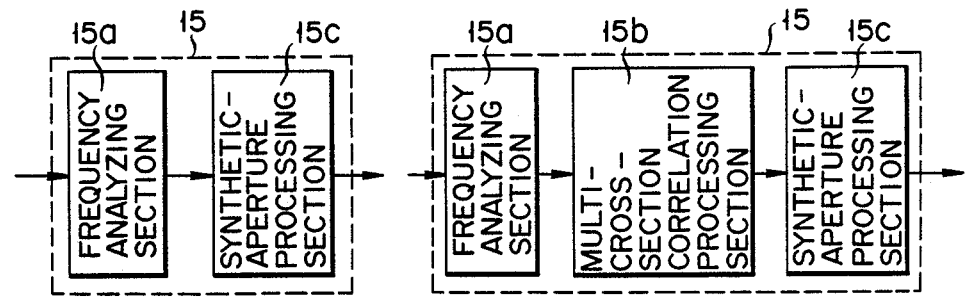

Computing unit 15 comprises frequency analyzing section 15a and synthetic aperture processing section 15c as shown in FIG. 16c. Echo waves, which are returned back from the object 5 being detected and obtained by frequency analysis, become hyperbolic.

In the case where the buried piping is located nearby, the hyperbolas are overlapped with respect to each other, prominently degrading the horizontal resolution. Here the amplitude level of waves present in the hyperbolic form is additively combined with the amplitude level of the wave present at the peak of the waveform to obtain a maximum amplitude image at that peak, so that the horizontal resolution can be enhanced.

Computing unit 15 comprises frequency analyzing section 15a, multi-cross-section processing section 15b and synthetic-aperture processing section 15c as shown in FIG. 16D.

In the case where the object to be detected is an underground buried piping having a linear structure, a correlation computation is performed, by multi-cross-section processing section 15b, on a plurality of cross-section data which has been obtained by frequency analyzing section 15a. Then echo waves other than those echo waves returned back from the buried piping are eliminated and the synthetic-aperture processing is performed, by synthetic aperture processing section 15c, on the echo waves. As a result, a cross-sectional image of better horizontal resolution can be obtained with respect to the underground buried piping of a linear structure.

If the cross-section image of the present application is used as set out above, it is possible to clearly recognize the presence and position of the buried piping.

Even if the echo waves returned back from the buried piping cannot be distinguished from the observation signal in a time zone due to the greater attenuation of the electromagnetic wave, it is still possible to achieve a sharp distinction with high accuracy and high resolution when the aforementioned method is employed.

Although the present invention has been explained as being applied to the detection of the underground buried object, it is still possible to detect an object of interest below the ground surface even if, as in the prior art, echo waves returned back from a target object cannot clearly been distinguished from spurious echo waves from the underground stone, etc., whose spurious echo waves have greater amplitude or even if a plurality of unwanted objects are present near one another.

The present invention can be applied to the detecting or searching of a cavity, geologic formation or invisible matter under the surface of the earth or ground, for example, the reinforced iron, or cavity, in the concrete structure, and to the recognizing of a an object flying in the air as opposed to the underground object.

We claim:

1. A method for detecting an object by a pulse radar method, comprising:

receiving as an observation signal an electromagnetic wave which is an echo wave returned back from an object;

dividing said observation signal into separate divided signal portions for a predetermined time interval;

transforming each divided signal portion into a frequency region by Fast Fourier Transformation to find a spectral distribution;

reading from the spectral distribution at least two of the following parameter values, a spectral peak frequency value $f_p$, a DC component ratio value $R_{dc}$ and a half value width value W as one combination;

extracting only each wave returned back from an object being detected, by eliminating as a spurious echo wave from said spectral distribution parameter values divided signal portions having a value other than that of the spectral peak frequency $f_p$ falling within a predetermined frequency range, that of the DC component ratio $R_{dc}$ falling within a predetermined DC component ratio, or that of the half value width W falling within a predetermined half value width; and displaying a cross-sectional image of the object from said extracted respective wave.

2. The method according to claim 1, wherein said dividing step comprises dividing said observation signal by a zero-crossing method into portions for a time corresponding to one cycle.

3. The method according to claim 1, wherein said reading step includes reading a spectral strength $I_p$ and DC component strength $I_{dc}$ of said spectral peak frequency $f_p$ and computing an equation of $$R_{dc}=I_{dc}/I_p$$

4. The method according to claim 1, wherein said extracting step includes eliminating as a spurious echo wave a divided wave portion whose spectral peak frequency $f_p$ lies outside a range of $f_{p1}<f_p<f_{p2}$, whose DC component ratio $R_{dc}$ lies outside a range of $R_{dc1}<R_{dc}<R_{dc2}$ or whose half value width lies outside a range of $W_1<W<W_2$.

5. An apparatus for detecting an object, comprising:
transmitting/receiving means for transmitting an electromagnetic wave and receiving as an observation signal an echo wave which is the electromagnetic wave returned back from the object;
sampling means for sampling said observation signal;
a signal dividing means for, after converting the signal which has been sampled into a digital signal through an A/D conversion, dividing the observation signal into separate divided signal waveform portions for a predetermined time interval $\Delta T$;
means for transforming each divided signal portion into a frequency region by Fast Fourier Transformation to find a spectral distribution;
means for reading from each spectral distribution corresponding to the respective divided observation signal at least two of the following parameter values, a spectrum peak frequency value $f_p$, a DC component ratio $R_{dc}$ and a half value width value W as one combination, for eliminating as a spurious echo wave from all parameter values divided signal portions having a value other than that of said spectral peak frequency $f_p$ falling within a predetermined frequency range, that of said DC component ratio $R_{dc}$ falling within a predetermined DC component range or that of said half value width W falling within a predetermined half value width, and extracting only an echo wave which is returned back from said object of linear structure; and
display means for displaying the object as a reconstituted cross-sectional image corresponding to the object.

6. A method for detecting an object, comprising the steps of:
receiving a plurality of observation signals including cross-sectional data relating to a direction substantially perpendicular to that of a buried object having a linear structure so as to recognize the buried object;
dividing each of said plurality of observation signals, constituting a plurality of cross-sectional data, into separate divided signal portions for a predetermined time interval $\Delta T$;
transforming each divided signal portion into a corresponding frequency region by Fast Fourier Transformation to find a spectral distribution;
reading from the respective spectral distribution corresponding to each of said plurality of divided signal portions at least two of the following parameter values, a spectral peak frequency value $f_p$, a DC component ratio value $R_{dc}$ and a half value width value W as one combination;
extracting only echo wave returned back from the object by eliminating as a spurious echo wave from the parameter values of the spectral distribution a value other than that of said spectral peak frequency $f_p$ falling within a predetermined frequency range, that of the DC component ratio $R_{dc}$ falling within a predetermined DC component ratio $R_{dc}$ and that of said fall value width W falling within a predetermined range;
performing a correlation computation on multi-cross-section data corresponding to the extracted echo wave returned back from the object and extracting only an echo wave returned back from the object of a linear structure; and
displaying a result of the correlation computation as a cross-sectional image of the object of a linear structure.

7. The method according to claim 6, wherein said dividing step comprises dividing said observation signal by a zero-crossing method into portions corresponding to one cycle.

8. The method according to claim 6, wherein said reading step includes reading a spectrum strength $I_p$ and DC component strength $I_{dc}$ of said spectrum peak frequency $f_p$ and said DC component ratio $R_{dc}$ is computed from $$R_{dc}=I_{dc}/I_p$$

9. The method according to claim 6, wherein said step for extracting only an echo wave from said object includes eliminating as a spurious echo wave divided signal portions whose spectrum peak frequency $f_p$ lies outside a frequency range of $f_{p1}<f_p<f_{p2}$, whose DC component ratio $R_{dc}$ lies outside a range of $R_{dc1}<R_{dc}<R_{dc2}$ or whose half value width W lies outside a half value width W.

10. An apparatus for detecting an object, comprising:
means for receiving a plurality of observation signals including cross-sectional data relating to a direction substantially perpendicular to that of a buried object having a linear structure so as to recognize the buried object;
means for sampling said plurality of observation signals constituting a plurality of cross-sectional data;
signal dividing means for after converting a signal which is sampled by said sampling means into a digital signal through an A/D conversion process, dividing the observation signal into separate divided signal portions for a predetermined time interval $\Delta T$;
means for transforming each divided signal portion into a frequency region by Fast Fourier Transformation to find a spectral distribution;
means for reading from each spectral distribution corresponding to the respective divided observation signal at least two of the following parameter values, a spectrum peak frequency value $f_p$, a DC component ratio $R_{dc}$ and a half value width value W as one combination, for eliminating as a spurious echo wave from all parameter values divided signal portions having a value other than that of said spectral peak frequency $f_p$ falling within a predetermined frequency range, that of said DC component ratio $R_{dc}$ falling within a predetermined DC component range or that of said half value width W falling within a predetermined half value width, and extracting only an echo wave which is returned back from said object of linear structure;

means for performing a correlation computation on said multi-cross-section data corresponding to the extracted echo wave and for extracting only an echo wave which is returned back from said object of a linear structure; and display means for displaying a result of the correlation computation as a cross-sectional image corresponding to said object of a linear structure.

11. A method for detecting an object, comprising the steps of:

receiving as an observation signal an electromagnetic wave which is an echo wave returned back from an object;

dividing said observation signal into separate divided signal portions for a predetermined time interval $\Delta T$;

transforming each divided signal portion into a frequency region by Fast Fourier Transformation to find a spectral distribution;

reading from said spectral distribution at least two of the following spectral distribution parameter values, a spectral peak frequency value $f_p$, a DC component ratio value $R_{dc}$ and a half value width value W as one combination;

extracting only an echo wave from said object by eliminating as a spurious echo wave divided signal portions having a value other than that of said spectrum peak frequency $f_p$ falling within a predetermined DC component ratio $R_{dc}$ falling within a predetermined DC component ratio range, or that of said half value width W falling within a predetermined half value width range;

performing a synthetic-aperture processing by computing a hyperbolic configuration having an arbitrary position $(X_1, Z_1)$ as an apex in the earth cross-section corresponding to the echo wave by said step for extracting only an echo wave from said object where $i=1\sim n$, $j=1\sim m$ and an, m: data points, adding to an amplitude of the apex $(X_1, Z_1)$ the amplitude of a waveform on said hyperbolic configuration calculated and recognizing, as a buried position of said object, that coordinate position $(X_1, Z_1)$ which is peaked in amplitude by doing so at said step; and displaying a synthetic-aperture-processed echo wave as a cross-sectional image whose horizontal resolution is improved.

12. An apparatus for detecting an object, comprising:

transmitting/receiving means for transmitting an electromagnetic wave and receiving as an observation signal a corresponding echo wave returned back from the object;

sampling means for sampling said observation signal;

dividing means for after converting a signal which is sampled by said sampling means into a digital signal through an A/D conversion, dividing the observation signal into separate divided signal portions for a predetermined time;

means for transforming each divided signal portion into a frequency region by Fast Fourier Transformation to find a spectral distribution; and means for reading from said spectral distribution at least two of the following parameter values, a spectrum peak frequency value $f_p$, a DC component ratio $R_{dc}$ and a half value width value W as one combination;

means for extracting only an echo wave from said object by eliminating as a spurious echo wave from said parameter values divided signal portions having a value other than that of said spectral frequency $f_p$ falling within a predetermined frequency range, that of said DC component ratio $R_{dc}$ falling within a predetermined DC component range or that of said half value width W falling within a predetermined half value width range;

a synthetic-aperture processing means for computing a hyperbolic configuration having an arbitrary position $(X_1, Z_1)$ as an apex in the earth cross-section corresponding to the echo wave by said step for extracting only an echo wave from said object where $i=1\sim n$, $j=1\sim m$ and n, m: data points, adding to an amplitude of the apex $(X_1, Z_1)$ the amplitude of a waveform on said hyperbolic configuration calculated and recognizing, as a buried position of said object, that coordinate position $(X_1, Z_z)$ which is peaked in amplitude by doing so; and means for displaying the synthetic-aperture-processed echo wave as a cross-sectional image whose horizontal resolution is enhanced.

13. A method for detecting an object, comprising the steps of:

receiving a plurality of observation signals including cross-sectional data relating to a direction substantially perpendicular to that of a buried object having a linear structure so as to recognize the buried object;

dividing respective observation signals, constituting said cross-sectional data, into separate divided signal portions for a predetermined time interval $\Delta T$;

transforming each divided signal portion into a frequency region by Fast Fourier Transformation to find a spectral distribution;

reading, from the spectrum distribution corresponding to the respective divided signal portion, at least two of the following parameter values, a spectrum peak frequency value $F_p$, a DC component ratio value $R_{dc}$ and a half value width value W as one combination;

extracting only each wave from said object by eliminating as a spurious echo wave from the respective spectrum distribution parameter values divided signal portion having a value other than that of said spectrum peak frequency $f_p$ falling within a predetermined frequency range, that of said DC component ratio $R_{dc}$ falling within a predetermined DC component ratio range and that of said half width value W;

performing a correlation computation on multi-cross-section data corresponding to said extracted echo wave returned back from an object and extracting only an echo wave returned back from an object of a linear structure; and performing a synthetic-aperture processing by computing a hyperbolic configuration having an arbitrary position $(X_1, Z_1)$ as an apex in the earth cross-section corresponding to the echo wave by said step for extracting only an echo wave from said object where $i=1\sim n$, $j=1\sim m$ and n, m: data points, adding to an amplitude of the apex $(X_1, Z_1)$ the amplitude of a waveform on said hyperbolic configuration calculated and recognizing, as a buried position of said object, that coordinate position $(X_1, Z_1)$ which is peaked in amplitude by doing so at said step; and displaying the echo wave, which is subjected to the correlation computation and synthetic-aperture processing, as a cross-sectional image of said object of a linear structure whose horizontal resolution is enhanced.

14. The method according to claim 13, wherein said dividing step comprises dividing said respective observation signal into portions, by a zero-crossing method, for every time corresponding to one cycle.

15. The method according to claim 13, wherein said reading step comprises reading a spectrum intensity $I_p$ and DC component strength $I_{dc}$ in the spectrum peak frequency $f_p$ and said DC component ratio $R_{dc}$ is computed from an equation given by:

$$R_{dc} = I_{dc}/I_p$$

16. The method according to claim 13, wherein said extracting step includes eliminating as a spurious echo wave an echo wave having a value other than that of said spectrum peak frequency $f_p$ falling within a frequency of $f_{p1} < f_p < f_{p2}$, that of said DC component ratio $R_{dc}$ falling within a DC component ratio range of $R_{dc1} < R_{dc} < R_{dc2}$ or that of said half value width W falling within a range of $W_1 < W < W_2$.

17. An apparatus for detecting an object, comprising:

receiving means for receiving a plurality of observation signals including cross-sectional data relating to a direction substantially perpendicular to that of a buried object having a linear structure so as to recognize the buried object;

sampling means for sampling said plurality of observation signals constituting a plurality of cross-sectional data;

signal dividing means for after converting a respective signal which is sampled by said sampling means into a digital signal through an A/D conversion, dividing the sampled observation signal into separate divided signal portions for a predetermined time interval $\Delta T$;

means for transforming each divided signal portion by a Fast Fourier Transformer means for finding a spectral distribution into a frequency region;

means for reading at least two of the following parameter values, a spectrum peak frequency value $F_p$, a DC component ratio value $R_{dc}$ and a half value width value W as one combination and extracting only an echo wave returned back from said object by eliminating as a spurious signal a divided signal portion having a value other than that of said spectral peak frequency value $f_p$ falling within a predetermined frequency range, that of said DC component ratio value $R_{dc}$ falling within a predetermined DC component ratio or that of said half value width value W falling within a predetermined half value width;

means for performing a correlation computation on said multi-cross-section data corresponding to the extracted echo wave and for extracting only an echo wave from said object of a linear structure;

synthetic-aperture processing means including means for evaluating a hyperbolic configuration with predetermined points as an apex below the surface of the earth area corresponding to the echo wave returned back from said object of a linear structure and means for additively combining a waveform amplitude on the hyperbola with the amplitude of the respective apex; and means for displaying said echo wave, which is subjected to said correlation computation and synthetic-aperture processing, as a cross-sectional image of said object of a linear structure whose horizontal resolution is enhanced.

* * * * *